United States Patent [19]

Ghisalberti et al.

[11] Patent Number: 4,608,158

[45] Date of Patent: Aug. 26, 1986

[54] FEEDING INSTALLATION FOR THE DAMPENING SOLUTION IN OFFSET PRINTING PROCESSES

[75] Inventors: Luigi Ghisalberti, Paladina; Marco Fumagalli, Oggiono, both of Italy

[73] Assignee: Web Italia S.r.l., Villanova di Castenaso, Italy

[21] Appl. No.: 722,033

[22] Filed: Apr. 11, 1985

[30] Foreign Application Priority Data

Aug. 1, 1984 [IT] Italy .............................. 12578 A/84

[51] Int. Cl.⁴ .............................................. B01D 29/42

[52] U.S. Cl. ................................... 210/96.1; 210/108; 210/290

[58] Field of Search ...................... 210/96.1, 104, 108, 210/275, 290

[56] References Cited

U.S. PATENT DOCUMENTS

| | | | |
|---|---|---|---|
| 3,382,983 | 5/1968 | Stewart | 210/290 |
| 3,947,356 | 3/1976 | Werhli | 210/96.1 |
| 4,146,474 | 3/1979 | Kagatani | 210/96.1 |
| 4,163,716 | 8/1979 | Turnbill | 210/96.1 |
| 4,187,175 | 2/1980 | Roberts et al. | 210/108 |

*Primary Examiner*—John Adee

*Attorney, Agent, or Firm*—Pollock, Vande Sande & Priddy

[57] ABSTRACT

An installation for continuously feeding and renewing, into the dampening fountains of printing processes, a solution comprising water and chemical additives, comprises a tank containing a solution that can be automatically replenished as to the percentage of water and chemical additives, by means of probes and automated devices controlling the level and some of the main parameters of said solution, e.g. acidity and density. The solution is refrigerated by a suitable apparatus and is agitated and stirred continuously by means of a re-circulation circuit which uses either ejectors or jet-pumps having their suction conduits connected to the discharge ducts from the printing press fountains which receive a proportional quantity of solution from a feeding circuit comprising at least one pump and filters.

8 Claims, 4 Drawing Figures

FEEDING INSTALLATION FOR THE DAMPENING SOLUTION IN OFFSET PRINTING PROCESSES

SUMMARY OF THE INVENTION

This invention relates to an installation for continuously feeding the dampening solution in a lithographic printing process. In the offset printing, the cylinder which carries the negative plate must be moistened continuously, prior to inking, to maintain unaltered the hydrophilic properties of the non-printing areas. To obtain said moistening, the plate cylinder effects a partial rotation in a fountain containing the dampening solution, formed mainly of water (in a percentage of 75 to 95%) and chemical additives. In order to obtain a neat printing, the dampening solution should be clean, should have proper hardness, pH and density values, and should be properly refrigerated. All these characteristics should be kept as constant as possible during the entire printing process. Heretofore, this problem had been solved only empirically, i.e. by feeding the fountains with water through an open circuit and introducing the additives directly into said fountains, or by pre-conditioning a certain amount of water with the additives in a suitable container and by keeping the temperature of the solution at a desired and constant level by means of a refrigerating circulator. Generally, the solution is fed to the fountains by a pump and is returned into said container by gravity. However, also this installation requires a person to check periodically the critical values of the solution and to correct them if they depart from the tolerance limits.

The invention provides an installation capable of forcedly feeding the dampening solution to the fountains of a printer, of continuously renewing the solution in said fountains, and of constantly checking and automatically maintaining the proper value of some chemical-physical characteristics of said solution.

BRIEF DESCRIPTION OF THE DRAWINGS

Greater details of the invention and the advantages resulting therefrom will appear from the following description of a preferred embodiment shown in the Figures of the accompanying sheets of drawings, wherein.

DESCRIPTION OF THE PREFERRED EMBODIMENT

Figure 1:
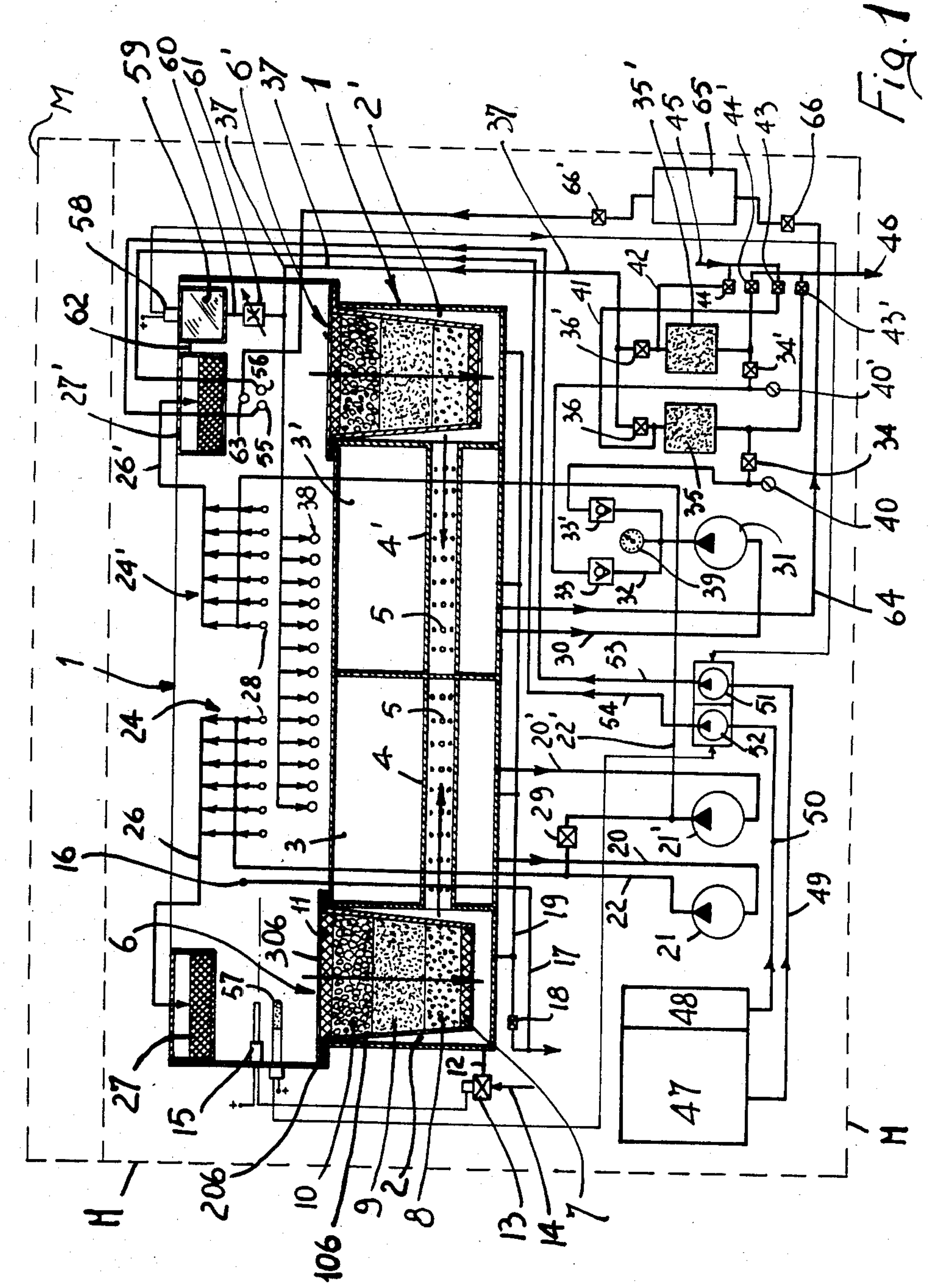
FIG. 1 shows, diagrammatically and with some portions in sectional view, the complete circuit which provides for the circulation and conditioning of the dampening solution.

With reference, first, to FIG. 1, a tank 1 preferably of acid-resistant plastics, e.g. of PVC, is arranged in the intermediate portion of a cabinet M, completely or partly of stainless steel. Arranged in the lower portion of said cabinet are the various electro-pumps, filters, containers for chemical additives and, possibly, the refrigerating plant; in the upper portion of said cabinet there is arranged the instrument board with the various control, detection and indication instruments. The tank 1 is provided at the bottom with four compartments 2—2' and 3—3', the compartments 2—2' being of open-top construction and the compartments 3—3' being completely separate from each other and from the upper portion of the tank but communicating with the side compartments 2—2' through one or more tubular ducts 4—4' traversing the compartments 3—3' longitudinally and provided with holes 5 of comparatively small diameter, whereby said ducts act as filters. In the compartments 2—2' there are arranged filtering cartridges 6—6' through which the solution is obliged to pass before reaching the inner compartments 3—3'. Each filtering cartridge comprises a body 106 shaped like a frustum of cone or pyramid which is provided at the top with a collar 206 which is sealingly secured to the top opening of the compartment 2 or 2' and onto which a reticular cover 306 is fixed. In the assembly 106-306, starting from the bottom, there are arranged: a layer 7 of synthetic sponge; a layer 8 of activated carbon; a layer 9 of ion-exchange resins; a layer 10 of expanded clay; and a final layer 11 of synthetic sponge, similar to layer 7.

Figure 2:
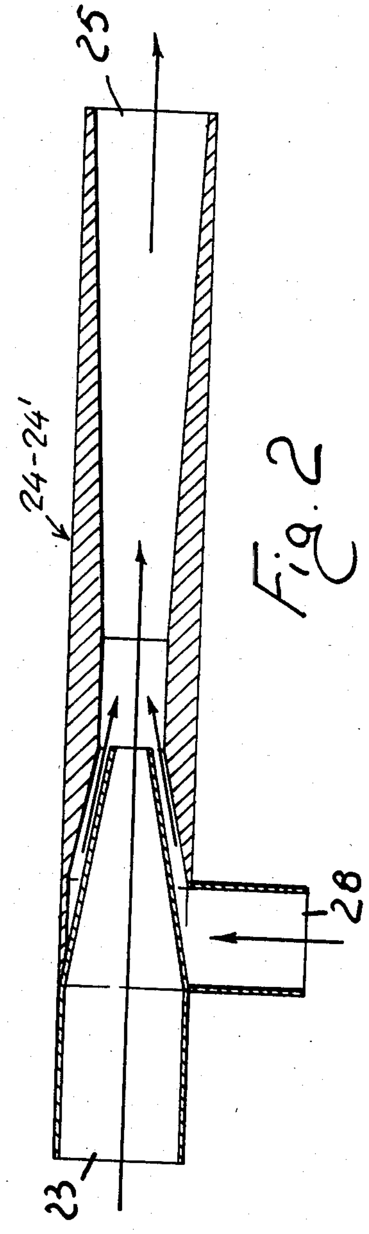
FIG. 2 shows diagrammatically one of the ejectors used to re-circulate the solution continuously either in the fountains of the printing press and in the tank containing said dampening solution.

At any suitable point of the tank 1 there opens a duct 12 closed by a solenoid valve 13 communicating with a source 14 of pressurized water, e.g. with the water-supply system, preferably with the intermediary of a conventional apparatus for effecting a sufficient softening of the water. The solenoid valve 13 is controlled by a probe 15 detecting the level of the solution in the tank 1 and arranged below a free-flow outlet 16 which is connected to a duct 17 which, in turn, is connected through a check valve 18 to the ducts 19 receiving the fluid discharged from the compartments 2—2', 3—3'. The valve 18 is opened only during the routine or the extraordinary maintenance of the installation, whilst said valve is closed during the normal operation of said installation. When first starting the installation a suitable control is acted upon and the solenoid valve 13 is opened automatically; when the level of the water in the tank 1 reaches the probe 15, said valve is closed, again automatically. Two ducts 20—20' are derived from the compartment 3 and lead to respective electro-pumps 21—21'. The ducts 22—22' from the delivery of the pumps 21—21' are connected to the inlet openings 23 of the ejector units 24—24' or the type which is diagrammatically shown in FIG. 2. The outlet openings 25 of the two ejector units are connected to a pair of ducts 26—26' of suitable section, and the ducts 26—26' will discharge into a pair of respective mechanical gravity filters 27—27' located in the upper portion of the tank 1, whereby the liquid outflowing from said filters will be re-circulated. As shown in FIG. 2, the ejectors 24—24' are provided with a respective opening 28 in which a suction effect is created by the flow of liquid in the Venturi tube of said ejector in the direction of the horizontal arrows. The openings 28 of the ejectors are connected to the discharge duct of the fountains of the printer, so as to ensure a continuous changeover of the dampening solution. At the same time, the ejectors 24—24' ensure a continuous re-circulation and, therefore, an effective stirring of the solution in the tank (see below), so that the characteristics of the solution will be rendered uniform and homogeneous. The delivery ducts 22—22' of the pumps 21—21' may be connected to each other by means of a by-pass solenoid valve 29 so as to ensure an uninterrupted operation of the installation even in case of failure of one of said pumps. The liquid in the tank 1, formed of water and chemical additives that will be specified below, is fed to the fountains of the printer through the following circuit. A duct 30 is connected to the compartment 3' and leads to an electro-pump 31. The delivery of said pump is branched with two ducts 32—32' which, through non-return valves 33—33' and solenoid valves 34—34', are connected to respective filters 35—35' preferably of the pressurized type. The outlets from the filters 35—35' are controlled by respective solenoid valves 36—36' and are parallelly connected to a single conduit 37 leading to a plurality of injectors 38 arranged on the same side of the cabinet M on which the suction openings 28 of the ejectors 24—24' are also arranged.

A pressure gauge 39 is arranged on the delivery of the electro-pump 31, and pressure-switches 40—40' are arranged at the inlet of filters 35—35'. During the normal operation of the installation, only one of the filters 35—35' is operating, while the other one is cut-off. When the pressure-switch 40 or 40' of the operating filter detects an excessive pressure and, therefore, a clogged or fouled filter, said pressure-switch inserts automatically in the circuit the filter which was not operating. The fouled filter is, instead, cut-off from the delivery circuit and is backwashed under the control of an electronic control unit (not shown) so as to be ready for operation when required. For these purposes, the inlet or outlet of each filter 25—25' are branched with ducts 41—41' and 42—42' connected to solenoid valves 43—43' and 44—44'. The solenoid valves 43-44 are connected to a source of pressurized clean water, diagrammatically shown at 45, while the solenoid valves 43'-44' are connected to a discharge 46 leading, for example, to a sewer system. The solenoid valve 43' or 44' controlling the discharge of the filter being backwashed is continuously opened and closed with proper alternating frequency to increase the efficiency of the backwashing operation.

In the lower portion of the cabinet M there are arranged two reservoirs 47 and 48 of different capacity, this difference also distinguishing the different liquids therein. The container 47 of larger capacity contains alcohol, generally insopropylic alcohol, while the smaller container 48 contains an acid additive. Said containers may be provided with a minimum-level indicator to visualize this function at a distance. Two conduits 49 and 50 from the respective containers 47 and 48 lead to respective electro-pumps 51-52 preferably (but not necessarily) of the volumetric and small-capacity type. Said electro-pumps have delivery conduits 53-54 discharging into the tank 1, e.g. at the points 55 and 56 (see below). The pump 52 is controlled by a probe 57 of conventional type, dipping in the tank 1 and detecting the pH of the dampening solution, while the pump 51 is controlled by a probe 58 detecting, either directly or indirectly, the density of the dampening solution which is delivered into the fountains of the printing press, said solution being partly delivered into a dwell container 59 through the branch conduit 60 which is controlled by a variable restrictor (a cock). A discharge duct 62 connects the container 59 to the filter 27'. The probes 57 and 58 detect continuously the respective parameters and, through electronic circuits pre-selecting the acidity and density values, and through the electro-pumps 51 and 52, cause these parameters to be initially brought to, and then kept at, the pre-established values to form, with said water, a suitable dampening solution for the matrix of the printer. To obtain a perfect admixture of alcohol, acid and water, the outlets 55 and 56 are preferably located at the discharge 63 re-introducing into the tank 1 the solution continuously withdrawn from the compartment 3' through a conduit 64 and suitably refrigerated through a thermostatic unit 65 which, in certain cases, may be located outside the cabinet M. Below the discharge 63, the solution is in such a turbulence condition as to ensure a perfect admixture therein of the additives dispensed by the outlets 55-56. The numerals 66—66' indicate valves which, if desired, may be located upstream and downstream of the unit 65. The circuits controlling the electro-pumps 51 and 52 may comprise respective manual controls for actuating manually, if required, said electro-pumps. These controls are not shown in the drawings because they are obvious and easily conceivable by any person skilled in the art.

Figure 3:
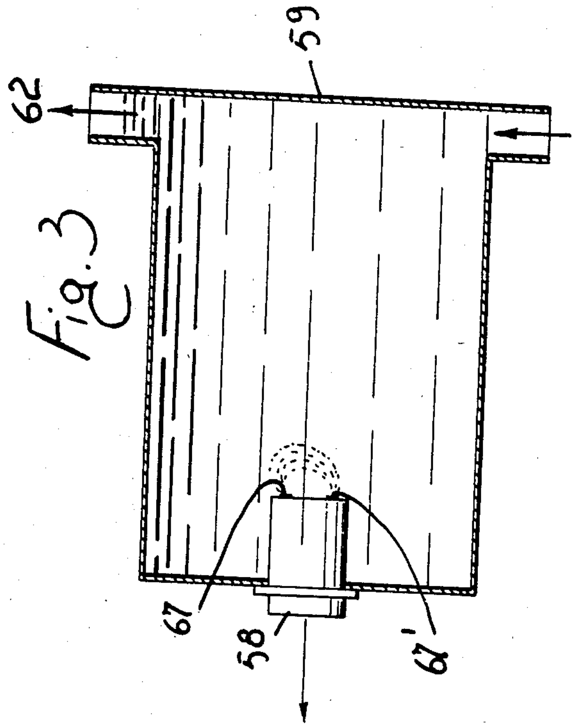
FIGS. 3 and 4 show, diagrammatically and with some portions in sectional view, two different embodiments of the unit for detecting the percentage of alcohol in the dampening solution.

The probe 58 detecting the density of the dampening solution and controlling the pump 51 may be in the form shown in FIG. 3 if the alcohol has not been treated with denaturants. In the illustrated embodiment, the probe 58 is arranged at a location in the container, which is remote from the inlet and outlet ducts of the solution, and therefore at a sufficiently calm location. The probe 58 of FIG. 3 comprises at least a pair of electrodes 67—67' arranged at a fixed and appropriate distance from each other, which are submerged in the solution and measure the electrical impedance of the portion of solution between said electrodes. From this measurement, through a successive electronic processing and a suitable algorithm, the density of the solution may be evaluated and this parameter may be visualized by means of a suitable instrument.

Figure 4:
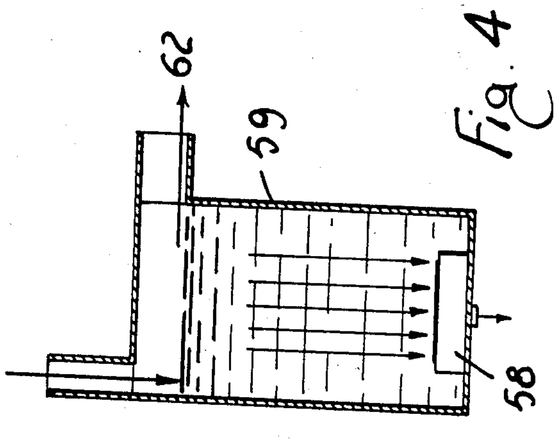

If the alcohol being used has been added with denaturants, the amount and nature of which are not always known and constant, the probe 58 may be in the form shown in FIG. 4, with a pressure transducer of pre-established size arranged on the bottom of a container 59 which is provided at the top with a wide discharge duct permitting the formation and permanence within said container, of a liquid column of known and constant height. The pressure value detected by the transducer 58 of FIG. 4, through a successive electronic processing and through a suitable algorithm, enables the evaluation of the dampening solution density and the visualization of this parameter by means of a suitable instrument.

It is now apparent that according to the invention the dampening fountains of the printing press will always contain the proper amount of solution, which is continuously renewed and, therefore, is always clean, at the right temperature and has all the chemical-physical characteristics required to obtain an optimum printing. Inasmuch as the feeding circuit for the dampening solution is substantially of closed configuration, once the installation has been started and has been brought to a normal running condition, the consumption of water and additive is limited to the amount of solution evaporated in the fountain and on the cylinder of the printing press. The level detector 15 and the probes 57-58 will operate to automatically maintain in the tank 1 a constant amount of solution having the pre-established chemical-physical characteristics.

The constructional details of the electric circuit and control, visualization and safety devices have been omitted since they are obvious and easily conceivable to any person skilled in the art.

I claim:

1. An installation for continuously feeding, renewing and conditioning the dampening solution in a lithographic printing process, characterized in that it comprises:

a tank (1) for containing the required amount of solution, said tank being connected through a solenoid valve (13) to a source (14) of sufficiently clean and softened water and being provided with a level-detecting probe (15) controlling said solenoid valve (13) to maintain the liquid in the tank at a constant level, said tank being also provided with an overflow outlet and with bottom drain outlets for complete emptying;

two softening-filtering units (6-4, 6′-4′) for the solution in the tank (1), said units being suitably integrated within said tank and adapted to operate on the solution being continuously circulated in said tank;

the first one of said softening-filtering units (6-4) being connected to the suction of at least one electro-pump (21) the delivery of which is connected to a plurality of ejectors (24—24′) or "jet-pumps" the suction opening (28) of which is connected to the discharge duct of the printer fountains to continuously discharge therefrom, for renewing purposes, the dampening solution, while the outlets of the various ejectors (24—24′) are connected to manifold ducts (26—26′) freely discharging into gravity filters (27—27′) which, in turn, will discharge into the tank containing the solution;

the second one of said softening-filtering units 6′-4′) being connected to the suction of at least one electro-pump (31) which, through at least one filter (35) preferably of the pressure type, delivers the dampening liquid to a plurality of injectors (38) having connected thereto the ducts feeding the solution to the fountains of the printing press;

containers (47-48) for the chemical additives to be mixed in the water, e.g. alcoholic and acid additives, said containers being provided with discharge ducts connected to respective electro-pumps (51-52) discharging into a high-turbulence area of the tank (1) containing the solution, said electro-pumps being preferably of small flowrate and of volumetric type and being controlled by respective circuits comprising probes (57-58) for detecting either directly or indirectly the pH and density of the dampening solution and which, through electronic processing and comparing devices, enable the selection of the desired values of pH and density and, through said electro-pump, permit said parameters to be maintained at the selected values;

a circuit (63-64-65) which withdraws the solution from one of said softening-filtering groups and which suitably cools the solution to a thermostat-controlled value.

2. An installation according to claim 1, in which the solution softening-filtering units (6-4, 6′-4′) comprise a filter (6—6′) formed by a plurality of layers of various materials and arranged as a cover on a compartment (2—2′) formed at the bottom of the tank (1), the lower portion of said compartment (2—2′) communicating with an adjacent compartment (3—3′) through a plurality of dead end ducts (4—4′) arranged longitudinally in the latter compartment and provided with small side perforations (5—5′) permitting the passage of the liquid and retaining any particles suspended in the dampening solution; said latter compartment having connected thereto the suction of the pump means feeding the ejectors (24—24′) and the injectors (38).

3. An installation according to claim 2, in which said softening filter (6—6′) comprises, in a removable cartridge, alternated layers of activated carbons (8), ion-exchange resins (9), expanded clay (10), all these layers being disposed between layers (7-11) of porous material, for example synthetic sponge.

4. An installation according claim 1, in which said ejectors (24—24′) are divided into two groups which are fed each from a respective electro-pump (21—21′), so as to permit the use of said ejectors either in part or in their total number, in accordance with the requirements and to permit as well that—through a by-pass valve (29) connecting the delivery ducts of the two pumps—the installation may be operated uninterruptedly even in case of failure of one of said pumps.

5. An installation according claim 1, in which the conduits (55-56) for introducing the chemical additives into the tank with the dampening solution will effect said introduction in proximity of the conduit (63) returning the cooled solution into the tank (1), i.e. at a point where said solution is in a turbulent condition whereby said additives can be mixed uniformly with the water.

6. An installation according to claim 1, in which two pressure filters (35—35′) are located downstream of the electro-pump (31) delivering the dampening solution to the injectors (38) and, therefore, to the printer fountains, said pressure-filters (35—35′) being provided with respective pressure-switches (40—40′), said filters being controlled by solenoid valves (34—34′-36—36′) and being connected to suitable means whereby only one of the two filters is inserted in the delivery circuit (37) for the dampening solution while the other filter is submitted automatically to at least one backwash and is prepared to take over the other filter when the latter is fouled and needs cleaning.

7. An installation according to claim 1, in which the apparatus for detecting the density of the solution comprises a circuit (56-67—67′) detecting the electric impedance of a portion of said solution being delivered to the injectors, means being provided to effect a successive electronic processing to supply, through a suitable algorithm, a datum which is proportional to the density of said solution.

8. An installation according to claim 1, in which the solution density detector comprises a circuit (58) detecting the pressure of a column of said solution, which has been created in constant-height and calm conditions within a suitable container (59), means being provided to effect a successive electronic processing of the signal from the pressure transducer (58) and to supply, through a suitable algorithm, a datum which is proportional to the density of said solution.

* * * * *